Figure 1:
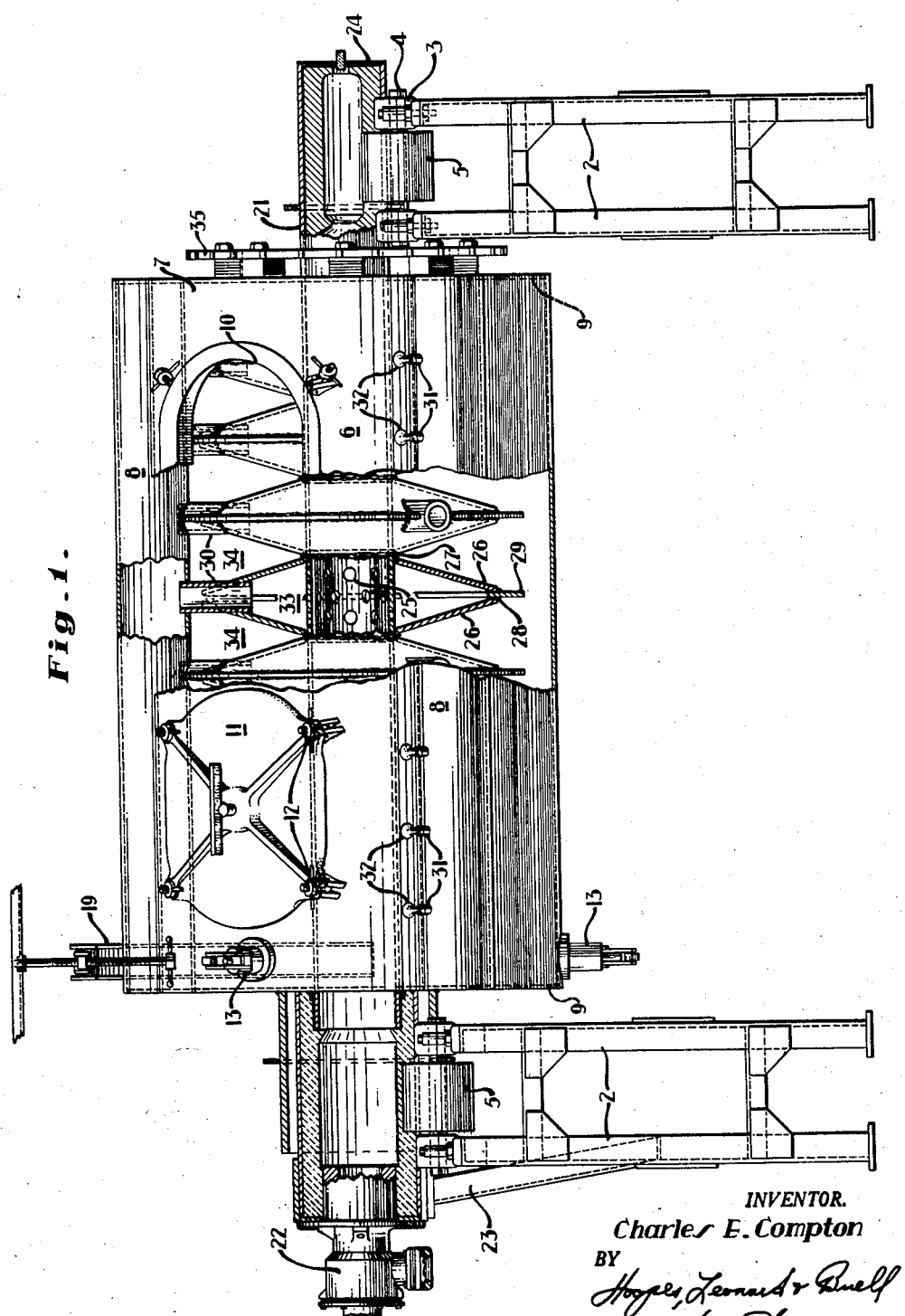

Aug. 19, 1958  C. E. COMPTON  2,848,209
DEHYDRATING APPARATUS
Filed April 16, 1954  2 Sheets-Sheet 2

INVENTOR.
Charles E. Compton
BY

United States Patent Office 2,848,209
Patented Aug. 19, 1958

2,848,209

DEHYDRATING APPARATUS

Charles E. Compton, Bridgeport, W. Va.

Application April 16, 1954, Serial No. 423,781

18 Claims. (Cl. 263—34)

This invention relates to dehydrating apparatus for dehydrating gypsum or the like. The apparatus includes a number of novel features whereby the dehydrating operation is performed with unprecedented speed and efficiency and a superior product is produced.

It has heretofore been proposed to dehydrate gypsum or the like in a rotating drum by applying the heat to the gypsum or the like within the rotating drum by steam but maintaining the steam for applying heat out of contact with the gypsum or the like. Such a dehydrating drum has not proved commercially satisfactory for several reasons. The time required for dehydration has been undesirably long. It has been necessary to provide the drum with two separate steam-tight chambers, one for the heating steam and the other for the gypsum or the like which during dehydration gives off steam the pressure of which must be controlled. Such apparatus is uneconomical when attempted to be employed on a commercial scale.

It has also been proposed to dehydrate gypsum or the like in a rotating drum by applying the heat to the gypsum or the like within the rotating drum by mounting the drum inside a furnace. That apparatus likewise has been uneconomical, requiring an undesirably long time for accomplishing the dehydration and producing an inferior product.

My improved dehydrating apparatus includes a number of features overcoming the disadvantages above mentioned, which features may be employed separately or together. Optimum advantage of my invention accrues from utilizing in combination all of the features thereof.

I provide dehydrating aparatus comprising means forming a chamber having reentrant portions in which a mass of pieces of gypsum or the like to be dehydrated is adapted to be disposed so that the mass is by the reentrant portions divided into semi-segregated smaller masses and means for applying heat to the reentrant portions of the chamber exteriorly of the chamber to heat the semi-segregated smaller masses of gypsum or the like at opposite sides thereof and thereby dehydrate the same. I preferably provide means for agitating the gypsum or the like in the chamber and while the gypsum or the like is being dehydrated. The means forming the chamber having reentrant portions in which the gypsum or the like is disposed may be rotated to tumble the gypsum or the like while the gypsum or the like is being dehydrated. The means for applying heat may constitute means for flowing gaseous heating medium in a predetermined path against the reentrant portions of the chamber exteriorly of the chamber to heat the semi-segregated smaller masses of gypsum or the like at opposite sides thereof while the gypsum or the like is being tumbled and thereby dehydrate the same.

While as above indicated certain of the advantages of my invention are obtainable in non-rotating dehydrating apparatus, I prefer to provide a rotating drum and to tumble a mass of pieces of gypsum or the like in the rotating drum during the dehydrating operation.

My dehydrating apparatus may comprise a generally cylindrical dehydrating drum having partition means therein dividing the space within the drum into two compartments each having a portion of its confining wall constituted by a peripheral portion of the drum, the drum having a first opening therethrough into one of the compartments through which gypsum or the like to be dehydrated is adapted to be charged into the dehydrating drum, and closure means for closing the first opening, the drum having a second opening therethrough into the other compartment through which heating medium is adapted to be continuously introduced to heat the gypsum or the like while being maintained out of contact therewith, the drum having a third opening therethrough in a peripheral portion thereof which is normally open and which communicates between the second mentioned compartment and the outside through which the heating medium is continuously exhausted during operation of the dehydrating drum. The second opening may extend generally axially of the drum and a burner may be provided continuously introducing hot products of combustion into the second opening. Means may be connected with the drum at the third opening directing the products of combustion as they are exhausted from the drum against the exterior of a peripheral portion of the drum constituting a portion of the confining wall of the first mentioned compartment.

In a preferred form my dehydrating apparatus may comprise a generally cylindrical drum within which gypsum or the like to be dehydrated is adapted to be disposed, a tube constituting a portion of the drum with part of the outside surface of the tube exposed inwardly and part exposed outwardly of the drum, a second tube within the drum and generally coaxial therewith, means for introducing heating medium into the second tube, connections within the drum between the two tubes and arranged to be in thermoconductive relation to gypsum or the like disposed within the drum, the first mentioned tube having an exhaust opening through which the heating medium is exhausted to the outside.

More specifically, my dehydrating apparatus may comprise a generally cylindrical drum within which gypsum or the like to be dehydrated is adapted to be disposed, a tube within the drum and generally coaxially therewith, means for introducing hot products of combustion into the tube, the tube having perforations therethrough throughout at least the major portion of the length of the drum, and means projecting generally radially outwardly from the tube so as to be disposed in thermoconductive relationship with the gypsum or the like in the drum receiving and confining the hot products of combustion passing through the perforations in the tube whereby to heat and dehydrate the gypsum or the like while maintaining the hot products of combustion out of contact with the gypsum or the like. The tube may carry hollow generally annular outwardly projecting means adapted to be disposed in thermoconductive relationship with the gypsum or the like in the drum and communicating with the interior of the tube so that heat from heating medium within the hollow generally annular outwardly projecting means is conducted therethrough to the gypsum or the like to heat and dehydrate the same while maintaining the hot products of combustion out of contact therewith. The means projecting outwardly from the tube may be spaced annular plate-like members which are joined at their outer portions forming alternate internal pockets for heating medium and external pockets for the gypsum or the like, the internal pockets being in communication with the interior of the tube. A conduit may be disposed radially outwardly from the outer portions of the plate-like members and connections may be provided from the internal pockets to the conduit so that heating medium may pass into and through the tube, internal pockets, connections and conduit. A plurality of such conduits may be provided each extending generally parallel to the tube, the conduits being disposed radially outwardly from the outer portions of the plate-like members and being spaced apart circumferentially of the drum. Normally open exhaust passages may extend from the conduits to the atmosphere and means such as a gas burner may be provided for continuously passing hot products of combustion through the tube, internal pockets, connections, conduits and exhaust passages. I prefer to provide an annular accordion-like structure disposed about the tube within the drum and connected and sealed to the tube at the ends of said structure and forming alternate internal pockets for heating medium and external pockets for gypsum or the like.

Other details, objects and advantages of the invention will become apparent as the following description of a present preferred embodiment thereof proceeds.

Figure 2:
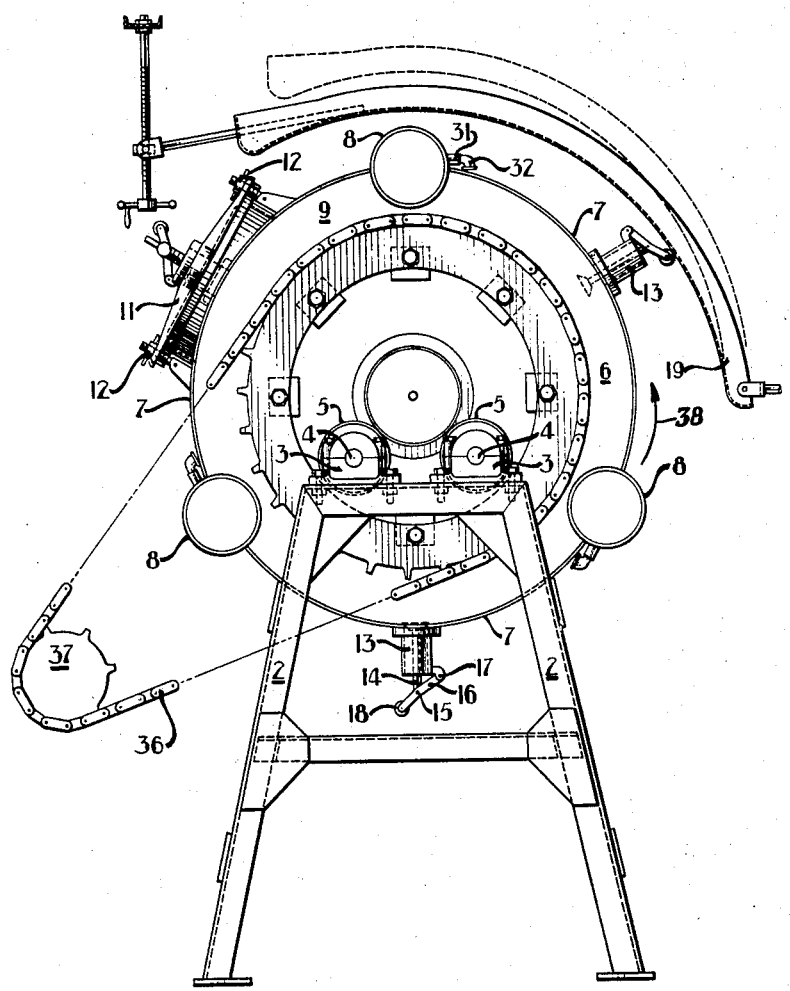

In the accompanying drawings I have shown a present preferred embodiment of the invention in which:

Figure 1 is a side view of apparatus for dehydrating gypsum or the like with portions cut away and portions in section; and Figure 2 is an end view of the apparatus shown in Figure 1.

Referring now more particularly to the drawings, there are provided two pedestals 2 each carrying bearings 3 rotatably supporting shafts 4 each carrying a supporting roller 5. There are two rollers 5 on each pedestal 2, the rollers of the respective pedestals forming drum supporting crotches which are in line longitudinally of the apparatus.

The dehydrating drum is designated generally by reference numeral 6. It comprises a generally cylindrical shell made up of curved single thickness metal portions 7 and tubes 8, the particular drum 6 shown in the drawing having three portions 7 and three tubes 8. The portions 7 and tubes 8 are connected together to form the generally cylindrical shell, as, for example, by welding. Each of the tubes 8 consequently constitutes a portion of the shell with part of the outside surface of the tube exposed inwardly and part exposed outwardly of the shell. Strengthening plates or struts not shown in the drawings may be provided for adding structural strength to the shell as may be deemed necessary or desirable or dictated by principles of structural design well known to those skilled in the art.

The dehydrating drum 6 has end plates 9 applied to and closing the shell at its ends. The drum has two lateral openings 10 through which a mass of pieces of gypsum or the like may be introduced for dehydrating and through which the dehydrated gypsum or the like may be dumped out at the end of the dehydrating process. Each of the openings 10 is provided with a removable closure member 11 and clamping means 12 of any suitable construction for clamping the closure member to the drum to close the corresponding opening 10. Sealing gaskets may be provided for sealing the closure members 11 about the openings 10 to make the drum steam-tight. The drum is provided with three circumferentially spaced relief valves 13 for relieving the steam pressure therewithin, each of the valves 13 having a stem 14 pivoted at 15 to a lever 16 pivoted at 17 to the valve casing and carrying a roller 18 adapted upon rotation of the drum 6 to be engaged by a valve operating cam 19 mounted beside the drum as shown for adjustment toward and away from the drum to cause opening of each relief valve to a desired extent and for a desired portion of the angular turning movement of the drum. Such a relief valve arrangement is not new and is not claimed by me as inventive.

A pipe 21 is provided which passes through the drum 6 and is substantially coaxial therewith and projects beyond both ends of the drum. Central openings for receiving the pipe 21 are provided in the end plates 9 of the drum and the end plates are preferably welded to the pipe 21 about those openings. Thus the drum 6 is supported by the pipe 21 through the drum end plates 9. The projecting ends of the pipe 21 seat in the drum supporting crotches formed by the rollers 5 so that the drum may be rotated about the axis of the pipe.

The left-hand end of the pipe 21 viewing Figure 1 is open and means are provided for introducing heating medium thereinto. In the form shown in the drawings I provided a gas burner 22 mounted on a stand 23 carried by the left-hand pedestal 2 viewing Figure 1. The gas burner delivers a blast of hot products of combustion into the pipe 21 from the left-hand end thereof moving toward the right viewing Figure 1. The right-hand end of the pipe 21 is closed by a closure cap 24. Within the drum 6 the pipe 21 is provided with perforations 25. The perforated portion of the pipe 21 preferably extends throughout at least the major portion of the length of the drum. Disposed about the perforated portion of the pipe 21 within the drum 6 is an annular accordion-like structure made up of annular plates 26 welded together at 27 and at 28. Where the plates 26 are joined at 28 an annular plate 29 is welded to them and projects generally radially as shown in Figure 1. Three connecting tubes 30 are in communication with the internal space between each opposed pair of plates 26 and are welded thereto and also communicate with the respective tubes 8 and are welded thereto whereby to form a sealed passage for products of combustion from the interior of the pipe 21, outwardly between plates 26, through the connecting tubes 30 and through the tubes 8. Each tube 8 is provided with a normally open exhaust passage 31 terminating in an elbow 32 so that the products of combustion passing out therethrough are directed against one of the portions 7 of the shell as shown in Figure 2, thereby heating the drum exteriorly. The accordion-like structure made up of the plates 26 and 29 and the connecting tubes 30 may expand and contract relatively to the drum due to temperature changes. The plate 26 of the accordion-like structure form internal pockets 33 which are in communication with the interior of the pipe 21 through the perforations 25 and external pockets 34 in which the gypsum or the like being dehydrated lies. The external pockets 34 substantially divide the mass of pieces of gypsum or the like into semi-segregated smaller masses of pieces to which heat from the products of combustion from the burner 22 is conducted both at the inner annular faces and at the opposite side faces thereof.

A ring gear or sprocket 35 is applied to the right-hand end plate 9 of the drum as shown in Figure 1. The drum may be rotated by any suitable driving means acting upon the ring gear or sprocket, such, for example, as a sprocket chain indicated by the chain line 36 in Figure 2 and driven by a sprocket indicated diagrammatically by the circle 37 which may derive its power from any suitable force. The direction of turning of the drum is as indicated by the arrow 38 in Figure 2.

The dehydrating operation is a batch operation. At the beginning of a batch or cycle the drum is empty. It is positioned with the openings 10 upwardly and a mass of pieces of gypsum or the like to be dehydrated is introduced into the drum through the openings 10. The pieces of gypsum or the like may be of varied sizes, normally ranging from pieces having a maximum dimension of an inch or so down to relatively fine particle size. The drum is largely filled with pieces of gypsum or the like so that the mass of pieces of gypsum or the like extends well above the top of the pipe 21 and preferably to at least about the level of the tops of the plates 26. The drum is filled full enough to avoid unnecessary waste space in it during the dehydrating operation but not so full that the pieces of gypsum or the like are packed tightly in the drum. Provision is thus made for substantial relative movement between the pieces of gypsum or the like during rotation of the drum.

After the mass of pieces of gypsum or the like has been introduced into the drum the closure members 11 are applied to and sealed about the openings 10 and the gas burner 22 is set in operation and the rotation of the drum is commenced. The drum may be rotated at various speeds, a speed of about six to twelve revolutions per minute being found satisfactory. As the drum rotates the pieces of gypsum or the like are tumbled therewithin but are substantially divided into semi-segregated masses in the pockets 34. The products of combustion from the burner 22 pass from left to right viewing Figure 1 through the pipe 21 and thence annularly outwardly through the perforations 25, the pockets 33, the connecting tubes 30, the tubes 8 and the exhaust passages 31 to the outside of the drum. Thus the passage for the products of combustion is open and the flow of products of combustion through the apparatus is continuous. The products of combustion heat the pieces of gypsum or the like in the pockets 24 by conductions through the plates 26 at the inner annular faces and at the opposite side faces of the semi-segregated masses of gypsum or the like in those pockets. The arrangement is such that unprecedented thermal efficiency is obtained. At the same time it is unnecessary to provide a steam-tight chamber for the heating medium.

The time of a complete cycle of operations utilizing my method may be of the order of one and one-half to three hours. The actual dehydration of the gypsum or the like may be accomplished in an hour or less. There is a preliminary preheating period before dehydration actually commences and during which free moisture is driven off from the gypsum or the like. The preheating period may range up to thirty to forty-five minutes. Also, after completion of the dehydration of the gypsum or the like there is a final drying period which may range up to an hour. The time required for preheating, dehydration and final drying depends on a number of factors such as the heat input at the burner, the condition, including size and moisture content, of the gypsum or the like, the temperature of the drum, the temperature of the gypsum or the like at the beginning of the operation, etc.

During the preheating period the valves 13 are kept closed. As the free moisture is driven off the pressure in the dehydrating chamber rises to in the neighborhood of 35 pounds per square inch gauge. Toward the end of the preheating period when most of the free moisture has been driven off I find that the pressure in the dehydrating chamber drops somewhat, possibly due to leakage through the valves 13 which during rotation of the drum and the accompanying impacts of the gypsum as it is tumbled may not maintain a perfect seal. After completion of the preheating of the gypsum or the like and at the beginning of the dehydrating period the pressure in the dehydrating chamber begins to rise and may rise to a pressure in the neighborhood of 40 pounds per square inch gauge. At this point the cam 19 is adjusted so that the valves 13 open slightly while opposite the cam during each revolution of the drum. This prevents the pressure in the dehydrating chamber from rising further. As the dehydrating progresses the cam 19 is adjusted closer to the drum axis so that the valves 13 open progressively wider until those valves are relatively wide open at the end of the dehydrating period. Consequently, during the later stages of the dehydrating period the pressure in the dehydrating chamber gradually drops to atmospheric pressure. The pressure in the dehydrating chamber remains at atmospheric pressure throughout the final drying period.

I find it desirable to preheat the drum before introducing gypsum or the like to be dehydrated. This is done by starting operation of the burner 22 with the drum empty but rotating. I desirably preheat the drum to a temperature of the order of 300° F. When the relatively cold gypsum or the like is introduced the temperature within the dehydrating chamber may be reduced to a temperature of the order of 220° F. During the preheating period the temperature in the dehydrating chamber rises to about 250° F. The temperature remains at about 250° F. during most of the dehydrating period and drops off somewhat toward the end of the dehydrating period. The temperature may drop to about 200° F. at the end of the dehydrating period or early in the final drying out period. During the final drying out period the temperature may rise to in the neighborhood of 270° F.

The above description of a cycle of operations is given purely by way of example and the various times, pressures and temperatures may be substantially varied due to changes in conditions.

The time required for the actual dehydration of the gypsum or the like and also the total time of the cycle of operations are both substantially less than the corresponding times previously deemed necessary. Thus my operation is unprecedentedly efficient. At the conclusion of the cycle the dehydrated gypsum or the like is dumped out of the drum and the cycle is repeated.

The method is claimed in my copending application Serial No. 423,805, filed of even date herewith.

While I have shown and described a present preferred embodiment of the invention it is to be distinctly understood that the invention is not limited thereto but may be otherwise variously embodied within the scope of the following claims.

I claim:

1. Dehydrating apparatus comprising means having generally inwardly projecting parts forming a chamber having reentrant portions in which a mass of pieces of gypsum or the like to be dehydrated is adapted to be disposed so that the mass is by the reentrant portions divided into semi-segregated smaller masses, the chamber having passages therethrough intermediate the reentrant portions, and means for applying heat to the reentrant portions of the chamber exteriorly of the chamber by passing a heating medium through said passages, in the same generally radial direction through all of said passages, to heat the semi-segregated smaller masses of gypsum or the like at opposite sides thereof and thereby dehydrate the same.

2. Dehydrating apparatus comprising means having generally inwardly projecting parts forming a chamber having reentrant portions in which a mass of pieces of gypsum or the like to be dehydrated is adapted to be disposed so that the mass is by the reentrant portions divided into semi-segregated smaller masses, the chamber having passages therethrough intermediate the reentrant portions, means for agitating the gypsum or the like in the chamber and means for applying heat to the reentrant portions of the chamber exteriorly of the chamber by passing a heating medium through said passages, in the same generally radial direction through all of said passages, to heat the semi-segregated smaller masses of gypsum or the like at opposite sides thereof while the gypsum or the like is being agitated and thereby dehydrate the same.

3. Dehydrating apparatus comprising means having generally inwardly projecting parts forming a chamber having reentrant portions in which a mass of pieces of gypsum or the like to be dehydrated is adapted to be disposed so that the mass is by the reentrant portions divided into semi-segregated smaller masses, the chamber having passages therethrough intermediate the reentrant portions, means for rotating the first mentioned means to tumble the gypsum or the like in the chamber and means for applying heat to the reentrant portions of the chamber exteriorly of the chamber by passing a heating medium through said passages, in the same generally radial direction through all of said passages, to heat the semi-segregated smaller masses of gypsum or the like at opposite sides thereof while the gypsum or the like is being tumbled and thereby dehydrate the same.

4. Dehydrating apparatus comprising means having generally inwardly projecting parts forming a chamber having reentrant portions in which a mass of pieces of gypsum or the like to be dehydrated is adapted to be disposed so that the mass is by the reentrant portions divided into semi-segregated smaller masses, the chamber having passages therethrough intermediate the reentrant portions, means for rotating the first mentioned means to tumble the gypsum or the like in the chamber and means for flowing gaseous heating medium in a predetermined path against the reentrant portions of the chamber exteriorly of the chamber and through said passages, in the same generally radial direction through all of said passages, to heat the semi-segregated smaller masses of gypsum or the like at opposite sides thereof while the gypsum or the like is being tumbled and thereby dehydrate the same.

5. Dehydrating apparatus comprising a generally cylindrical dehydrating drum having partition means therein spanning the interior of the drum and dividing the space within the drum into two compartments each having a portion of its confining wall constituted by a peripheral portion of the drum, the drum having a first opening therethrough into one of the compartments through which gypsum or the like to be dehydrated is adapted to be charged into the dehydrating drum, and closure means for closing the first opening, the drum having a second opening therethrough into the other compartment through which heating medium is adapted to be continuously introduced to heat the gypsum or the like while being maintained out of contact therewith, the drum having a third opening therethrough in a peripheral portion thereof which is normally open and which communicates between the second mentioned compartment and the outside through which the heating medium is continuously exhausted during operation of the dehydrating drum.

6. Dehydrating apparatus comprising a generally cylindrical dehydrating drum having partition means therein spanning the interior of the drum and dividing the space within the drum into two compartments each having a portion of its confining wall constituted by a peripheral portion of the drum, the drum having a first opening therethrough into one of the compartments through which gypsum or the like to be dehydrated is adapted to be charged into the dehydrating drum, closure means for closing the first opening, the drum having a second opening therethrough extending generally axially into the other compartment through which heating medium is adapted to be continuously introduced to heat the gypsum or the like while being maintained out of contact therewith, and a burner continuously introducing hot products of combustion into the second opening, the drum having a third opening therethrough in a peripheral portion thereof which is normally open and which communicates between the second mentioned compartment and the outside through which the products of combustion are continuously exhausted during operation of the dehydrating drum.

7. Dehydrating apparatus comprising a generally cylindrical dehydrating drum having partition means therein spanning the interior of the drum and dividing the space within the drum into two compartments each having a portion of its confining wall constituted by a peripheral portion of the drum, the drum having a first opening therethrough into one of the compartments through which gypsum or the like to be dehydrated is adapted to be charged into the dehydrating drum, closure means for closing the first opening, the drum having a second opening therethrough extending generally axially into the other compartment through which heating medium is adapted to be continuously introduced to heat the gypsum or the like while being maintained out of contact therewith, a burner continuously introducing hot products of combustion into the second opening, the drum having a third opening therethrough in a peripheral portion thereof which is normally open and which communicates between the second mentioned compartment and the outside through which the products of combustion are continuously exhausted during operation of the dehydrating drum, and means connected with the drum at the third opening directing the products of combustion as they are exhausted from the drum against the exterior of a peripheral portion of the drum constituting a portion of the confining wall of the first mentioned compartment.

8. Dehydrating apparatus comprising a generally cylindrical drum within which gypsum or the like to be dehydrated is adapted to be disposed, a tube constituting a portion of the drum with part of the outside surface of the tube exposed inwardly and part exposed outwardly of the drum, a second tube within the drum and generally coaxial therewith, means for introducing heating medium into the second tube, connections within the drum between the two tubes at spaced intervals throughout the length of the drum through which heating medium passes from the second tube to the first mentioned tube and arranged to be in thermoconductive relation to gypsum or the like disposed within the drum, the first mentioned tube having an exhaust opening through which the heating medium is exhausted to the outside.

9. Dehydrating apparatus comprising a closed generally cylindrical drum within which gypsum or the like to be dehydrated is adapted to be disposed, a tube within the drum and generally coaxial therewith, means for introducing hot products of combustion into the tube, the tube having perforations therethrough throughout at least the major portion of the length of the drum, means projecting generally radially outwardly from the tube so as to be disposed in thermoconductive relationship with the gypsum or the like in the drum receiving and confining the hot products of combustion passing through the perforations in the tube whereby to heat and dehydrate the gypsum or the like while maintaining the hot products of combustion out of contact with the gypsum or the like and means connected with the outwardly projecting means at the outer end thereof receiving and conveying away the hot products of combustion.

10. Dehydrating apparatus comprising a closed generally cylindrical drum within which gypsum or the like to be dehydrated is adapted to be disposed, a tube within the drum and generally coaxial therewith, means for introducing hot products of combustion into the tube, generally annular outwardly projecting means carried by the tube adapted to be disposed in thermoconductive relationship with gypsum or the like in the drum and communicating with the interior of the tube so that heat from the heating medium within the hollow generally annular outwardly projecting means is conducted therethrough to the gypsum or the like to heat and dehydrate the same while maintaining the hot products of combustion out of contact therewith and means connected with the outwardly projecting means at the outer end thereof receiving and conveying away the hot products of combustion.

11. Dehydrating apparatus comprising a closed drum within which gypsum or the like to be dehydrated is adapted to be disposed, a tube within the drum, spaced annular plate-like members projecting outwardly from the tube and peripherally joined at their outer portions forming alternate internal pockets for heating medium and external pockets for the gypsum or the like, the internal pockets being in communication with the interior of the tube, means for introducing heating medium into the tube and means connected with the projecting plate-like members at the outer ends of the internal pockets receiving and conveying away the heating medium.

12. Dehydrating apparatus comprising a drum within which gypsum or the like to be dehydrated is adapted to be disposed, a tube within the drum, spaced annular plate-like members projecting outwardly from the tube and peripherally joined at their outer portions forming alternate internal pockets in communication with the interior of the tube for heating medium and external pockets for the gypsum or the like, a conduit disposed radially outwardly from the outer portions of the plate-like members, connections from the internal pockets to the conduit and means for introducing heating medium into and through the tube, internal pockets, connections and conduit.

13. Dehydrating apparatus comprising a drum within which gypsum or the like to be dehydrated is adapted to be disposed, a tube within the drum, spaced annular plate-like members projecting outwardly from the tube and peripherally joined at their outer portions forming alternate internal pockets in communication with the interior of the tube for heating medium and external pockets for the gypsum or the like, a plurality of conduits each extending generally parallel to the tube, the conduits being disposed radially outwardly from the outer portions of the plate-like members and being spaced apart circumferentially of the drum, connections from the internal pockets to the conduits and means for introducing heating medium into and through the tube, internal pockets, connections and conduit.

14. Dehydrating apparatus comprising a drum within which gypsum or the like to be dehydrated is adapted to be disposed, a tube within the drum, spaced annular plate-like members projecting outwardly from the tube and peripherally joined at their outer portions forming alternate internal pockets in communication with the interior of the tube for heating medium and external pockets for the gypsum or the like, a plurality of conduits each extending generally parallel to the tube, the conduits being disposed radially outwardly from the outer portions of the plate-like members and being spaced apart circumferentially of the drum, connections from the internal pockets to the conduits, normally open exhaust passages from the conduits to the atmosphere and means for continuously passing hot products of combustion through the tube, internal pockets, connections, conduits and exhaust passages.

15. Dehydrating apparatus comprising a closed drum within which gypsum or the like to be dehydrated is adapted to be disposed, a tube within the drum, an annular accordion-like structure disposed about the tube and forming alternate internal pockets for heating medium and external pockets for the gypsum or the like, the internal pockets being in communication with the interior of the tube, means for introducing heating medium into the tube and means connected with the annular accordion-like structure at the outer ends of the internal pockets receiving and conveying away the heating medium.

16. Dehydrating apparatus comprising a drum within which gypsum or the like to be dehydrated is adapted to be disposed, a tube within the drum, spaced annular plate-like members projecting outwardly from the tube and peripherally joined at their outer portions, generally radially extending annular members projecting outwardly from the outer portions of the plate-like members, the plate-like members and the generally radially extending annular members forming alternate internal pockets for heating medium and external pockets for the gypsum or the like, the internal pockets being in communication with the interior of the tube, and means for introducing heating medium into the tube.

17. Dehydrating apparatus comprising a drum within which gypsum or the like to be dehydrated is adapted to be disposed, a tube within the drum, an annular accordion-like structure disposed about the tube and forming alternate internal pockets in communication with the interior of the tube for heating medium and external pockets for the gypsum or the like, a plurality of conduits each extending generally parallel to the tube, the conduits being disposed radially outwardly from the annular accordion-like structure and being spaced apart circumferentially of the drum, connections from the interior of the annular accordion-like structure to the conduits, normally open exhaust passages from the conduits to the atmosphere and means for continuously passing hot products of combustion through the tube, annular accordion-like structure, connections, conduits and exhaust passages.

18. Dehydrating apparatus comprising a drum within which gypsum or the like to be dehydrated is adapted to be disposed, a tube within the drum, an annular accordion-like structure disposed about the tube and forming alternate internal pockets in communication with the interior of the tube for heating medium and external pockets for the gypsum or the like, a plurality of conduits each extending generally parallel to the tube, the conduits being disposed radially outwardly from the annular accordion-like structure and being spaced apart circumferentially of the drum, connections from the interior of the annular accordion-like structure to the conduits, normally open exhaust passages from the conduits to the atmosphere, means for continuously passing hot products of combustion through the tube, annular accordion-like structure, connections, conduits and exhaust passages and means for delivering steam from the external pockets.

References Cited in the file of this patent

UNITED STATES PATENTS

| | | |
|---|---|---|
| 520,565 | Howard | May 29, 1894 |
| 714,842 | Wentz | Dec. 2, 1902 |
| 1,714,853 | Dobbelstein | May 28, 1929 |
| 1,718,542 | Dobbelstein | June 25, 1929 |
| 1,967,029 | Karrick et al. | July 17, 1934 |
| 2,389,307 | Griffoul | Nov. 20, 1945 |
| 2,479,576 | Karrick | Aug. 23, 1949 |